(12) United States Patent
Radev et al.

(10) Patent No.: US 12,007,859 B2
(45) Date of Patent: Jun. 11, 2024

(54) LIFECYCLE MANAGEMENT OF VIRTUAL INFRASTRUCTURE MANAGEMENT SERVER APPLIANCE

(71) Applicant: VMWARE, INC., Palo Alto, CA (US)

(72) Inventors: Ivaylo Radoslavov Radev, Sofia (BG); Akash Kodenkiri, Bangalore (IN); Anil Narayanan Nair, Bangalore (IN); Ammar Rizvi, Bangalore (IN); Niharika Narasimhamurthy, Bangalore (IN); Krishnendu Gorai, Bangalore (IN)

(73) Assignee: VMware LLC, Palo Alto, CA (US)

( * ) Notice: Subject to any disclaimer, the term of this patent is extended or adjusted under 35 U.S.C. 154(b) by 86 days.

(21) Appl. No.: 17/670,544

(22) Filed: Feb. 14, 2022

(65) Prior Publication Data
US 2023/0195584 A1 Jun. 22, 2023

(30) Foreign Application Priority Data
Dec. 18, 2021 (IN) .............................. 202141059173

(51) Int. Cl.
*G06F 11/20* (2006.01)
*G06F 8/61* (2018.01)
(Continued)

(52) U.S. Cl.
CPC ............ *G06F 11/2069* (2013.01); *G06F 8/63* (2013.01); *G06F 8/71* (2013.01); *G06F 9/5072* (2013.01);
(Continued)

(58) Field of Classification Search
CPC .......... G06F 11/2069; G06F 8/63; G06F 8/71; G06F 9/5072; G06F 11/1451;
(Continued)

(56) References Cited

U.S. PATENT DOCUMENTS

2014/0258613 A1* 9/2014 Sampathkumar ... G06F 11/1469
711/114
2016/0371007 A1* 12/2016 Shani .................. G06F 11/1464
(Continued)

OTHER PUBLICATIONS

Both, David: "A Linux user's guide to Logical Volume Management," Opensource.com, Sep. 22, 2016, 16 pages, Retrieved from the Internet on Mar. 18, 2022, URL: https://opensource.com/business/16/9/linux-users-guide-lvm.

*Primary Examiner* — Hua J Song
(74) *Attorney, Agent, or Firm* — Kim & Stewart LLP

(57) ABSTRACT

A method of upgrading a VIM server appliance includes: creating a snapshot of logical volumes mapped to physical volumes that store configuration and database files of virtual infrastructure management (VIM) services provided by a first VIM server appliance to be upgraded; after the snapshot is created, expanding the configuration and database files to be compatible with a second VIM server appliance; replicating the logical volumes which have been modified as a result of expanding the configuration and database files, in the second VIM server appliance; after replication, performing a switchover of VIM services that are provided, from the first VIM server appliance to the second VIM server appliance; and upon failure of any of the steps of expanding, replicating, and performing the switchover, aborting the upgrade, and reverting to a version of the configuration and database files that was preserved by creating the snapshot.

20 Claims, 8 Drawing Sheets

(51) Int. Cl.
  *G06F 8/71*   (2018.01)
  *G06F 9/50*   (2006.01)
  *G06F 11/14*  (2006.01)
(52) U.S. Cl.
  CPC ...... *G06F 11/1451* (2013.01); *G06F 11/1464* (2013.01); *G06F 11/2023* (2013.01); *G06F 2201/84* (2013.01)
(58) Field of Classification Search
  CPC ............ G06F 11/1464; G06F 11/2023; G06F 2201/84; G06F 8/65; G06F 11/1433; G06F 11/203; G06F 2201/815; G06F 11/1484
  USPC ........................................................ 711/162
  See application file for complete search history.

(56) References Cited

U.S. PATENT DOCUMENTS

2022/0342763 A1\* 10/2022 Ashkenazi .......... G06F 11/1471
2023/0037199 A1\* 2/2023 Holzman ............ H04L 41/0843

\* cited by examiner

LIFECYCLE MANAGEMENT OF VIRTUAL INFRASTRUCTURE MANAGEMENT SERVER APPLIANCE

RELATED APPLICATION

Benefit is claimed under 35 U.S.C. 119(a)-(d) to Foreign Application Serial No. 202141059173 filed in India entitled "LIFECYCLE MANAGEMENT OF VIRTUAL INFRASTRUCTURE MANAGEMENT SERVER APPLIANCE", on Dec. 18, 2021, by VMware, Inc., which is herein incorporated in its entirety by reference for all purposes.

BACKGROUND

In a software-defined data center (SDDC), virtual infrastructure, which includes virtual machines (VMs) and virtualized storage and networking resources, is provisioned from hardware infrastructure that includes a plurality of host computers (hereinafter also referred to simply as "hosts"), storage devices, and networking devices. The provisioning of the virtual infrastructure is carried out by management software, referred to herein as virtual infrastructure management (VIM) software, that communicates with virtualization software (e.g., hypervisor) installed in the host computers.

VIM server appliances, such as VMware vCenter® server appliance, include such VIM software and are widely used to provision SDDCs across multiple clusters of hosts, where each cluster is a group of hosts that are managed together by the VIM software to provide cluster-level functions, such as load balancing across the cluster by performing VM migration between the hosts, distributed power management, dynamic VM placement according to affinity and anti-affinity rules, and high availability (HA). The VIM software also manages a shared storage device to provision storage resources for the cluster from the shared storage device.

For customers who have multiple SDDCs deployed across different geographical regions, and deployed in a hybrid manner, e.g., on-premise, in a public cloud, or as a service, the process of upgrading VIM server appliances across many different locations has proven to be challenging because of the many requirements that need to be met. The first is minimal downtime. During the downtime, customer workloads running on the virtual infrastructure are not affected, but none of the management services provided through the VIM server, such as the cluster-level functions described above, are available. The second is the requirement to keep the VIM server appliances on the same version or different by one version at worst. The third is the ability to recover from anticipated upgrade failures within permissible service-level agreement (SLA).

SUMMARY

One or more embodiments provide a method of upgrading a VIM server appliance. The method comprises: creating a snapshot of logical volumes mapped to physical volumes that store configuration and database files of VIM services provided by a first VIM server appliance to be upgraded; after the snapshot is created, expanding the configuration and database files to be compatible with a second VIM server appliance; replicating the logical volumes which have been modified as a result of expanding the configuration and database files, in the second VIM server appliance; after replication, performing a switchover of VIM services that are provided, from the first VIM server appliance to the second VIM server appliance; and upon failure of any of the steps of expanding, replicating, and performing the switchover, aborting the upgrade, and reverting to a version of the configuration and database files that was preserved by creating the snapshot.

Further embodiments include a non-transitory computer-readable storage medium comprising instructions that cause a computer system to carry out the above method, as well as a computer system configured to carry out the above method.

DETAILED DESCRIPTION

One or more embodiments employ a cloud control plane for managing SDDCs, which may be of different types and which may be deployed across different geographical regions. In the embodiment illustrated herein, the upgrade of VIM server appliances of a customer, which are distributed across multiple locations, is instructed through the cloud control plane. Cloud service agents running locally in the SDDCs establish cloud inbound connections with the cloud control plane to retrieve the task to upgrade the VIM server appliances. Each cloud service agent then downloads the image of the upgraded VIM server appliance and delegates the task to upgrade the VIM server appliance to a lifecycle manager (LCM) running in the VIM server appliance.

Figure 1:
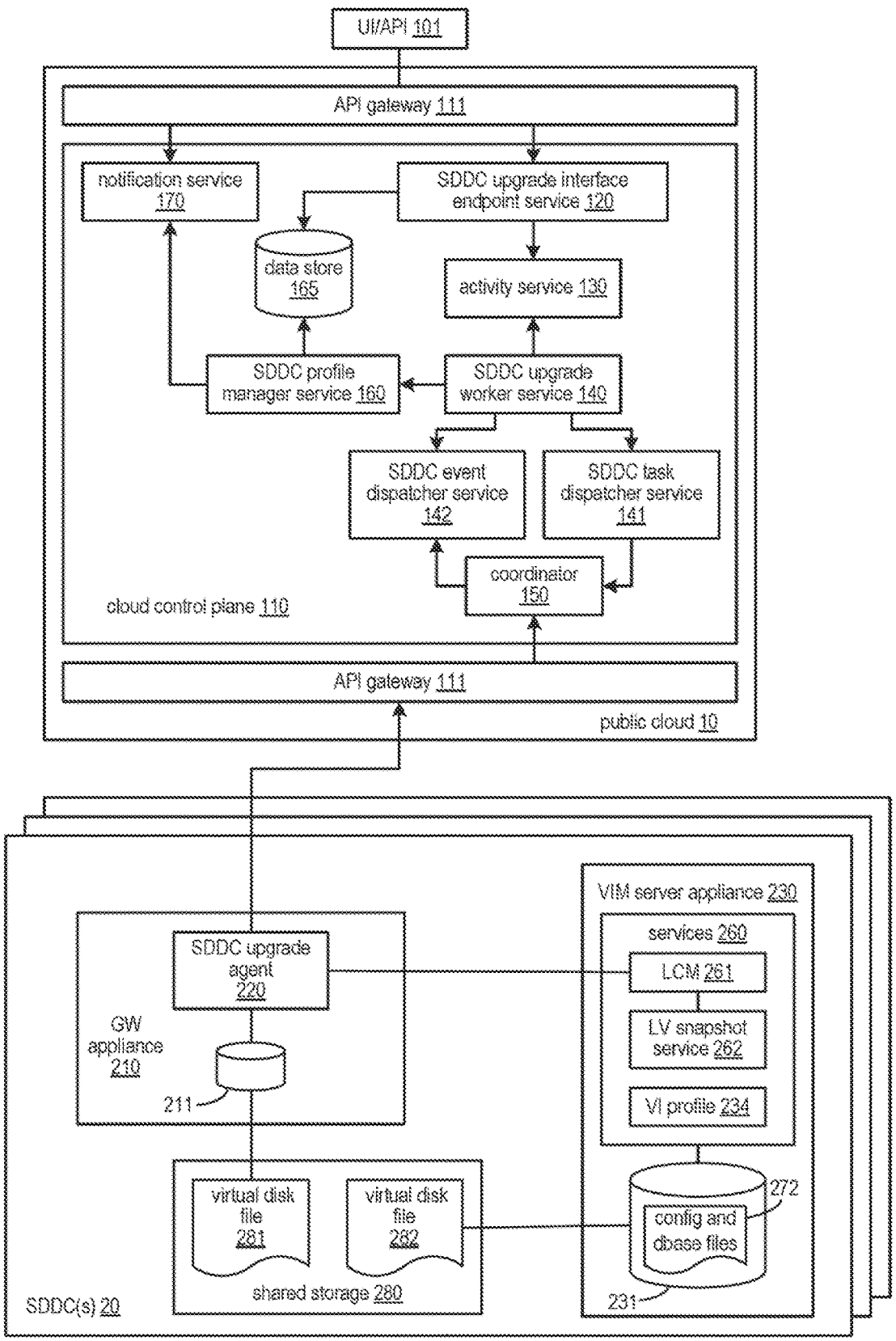
FIG. 1 depicts a cloud control plane implemented in a public cloud, and a plurality of SDDCs that are managed through the cloud control plane, according to embodiments.

FIG. 1 depicts a cloud control plane 110 implemented in a public cloud 10, and a plurality of SDDCs 20 that are managed through cloud control plane 110. In the embodiment illustrated herein, cloud control plane 110 is accessible by multiple tenants through UI/API 101 and each of the different tenants manage a group of SDDCs through cloud control plane 110. In the following description, a group of SDDCs of one particular tenant is depicted as SDDCs 20, and to simplify the description, the operation of cloud control plane 110 will be described with respect to management of SDDCs 20. However, it should be understood that the SDDCs of other tenants have the same appliances, software products, and services running therein as SDDCs 20, and are managed through cloud control plane 110 in the same manner as described below for SDDCs 20.

A user interface (UI) or an application programming interface (API) that interacts with cloud control plane 110 is depicted in FIG. 1 as UI/API 101. Through UI/API 101, an administrator of SDDCs 20 can issue commands to upgrade the VIM server appliance.

Cloud control plane 110 represents a group of services running in virtual infrastructure of public cloud 10 that interact with each other to provide a control plane through which the administrator of SDDCs 20 can manage SDDCs 20 by issuing commands through UI/API 101. API gateway 111 is also a service running in the virtual infrastructure of public cloud 10 and this service is responsible for routing cloud inbound connections to the proper service in cloud control plane 110, e.g., SDDC upgrade interface endpoint service 120, notification service 170, or coordinator 150.

SDDC upgrade interface endpoint service 120 is responsible for accepting commands made through UI/API 101 and returning the result to UI/API 101. An operation requested in the commands can be either synchronous or asynchronous. Asynchronous operations are stored in activity service 130, which keeps track of the progress of the operation, and an activity ID, which can be used to poll for the result of the operation, is returned to UI/API 101. If the operation targets multiple SDDCs 20 (e.g., an operation to upgrade the VIM server appliance), SDDC upgrade interface endpoint service 120 creates an activity which has children activities. SDDC upgrade worker service 140 processes these children activities independently and respectively for multiple SDDCs 20, and activity service 130 tracks these children activities according to results returned by SDDC upgrade worker service 140.

SDDC upgrade worker service 140 polls activity service 130 for new operations and processes them by passing the tasks to be executed to SDDC task dispatcher service 141. SDDC upgrade worker service 140 then polls SDDC task dispatcher service 141 for results and notifies activity service 130 of the results. SDDC upgrade worker service 140 also polls SDDC event dispatcher service 142 for events posted to SDDC event dispatcher service 142 and handles these events based on the event type.

SDDC task dispatcher service 141 dispatches each task passed thereto by SDDC upgrade worker service 140, to coordinator 150 and tracks the progress of the task by polling coordinator 150. Coordinator 150 accepts cloud inbound connections, which are routed through API gateway 111, from SDDC upgrade agents 220. SDDC upgrade agents 220 are responsible for establishing cloud inbound connections with coordinator 150 to acquire tasks dispatched to coordinator 150 for execution in their respective SDDCs 20, and orchestrating the execution of these tasks. Upon completion of the tasks, SDDC upgrade agents 220 return results to coordinator 150 through the cloud inbound connections. SDDC upgrade agents 220 also notify coordinator 150 of various events through the cloud inbound connections, and coordinator 150 in turn posts these events to SDDC event dispatcher service 142 for handling by SDDC upgrade worker service 140.

SDDC profile manager service 160 is responsible for storing the desired state documents in data store 165 (e.g., a virtual disk or a depot accessible using a URL) and, for each of SDDCs 20, tracks the history of the desired state document associated therewith and any changes from its desired state specified in the desired state document, e.g., using a relational database.

An operation requested in the commands made through UI/API 101 may be synchronous, instead of asynchronous. An operation is synchronous if there is a specific time window within which the operation must be completed. Examples of a synchronous operation include an operation to get the desired state of an SDDC or an operation to get SDDCs that are associated with a particular desired state. In the embodiments, to enable such operations to be completed within the specific time window, SDDC configuration interface endpoint service 120 has direct access to data store 165.

As described above, a plurality of SDDCs 20, which may be of different types and which may be deployed across different geographical regions, is managed through cloud control plane 110. In one example, one of SDDCs 20 is deployed in a private data center of the customer and another one of SDDCs 20 is deployed in a public cloud, and all of SDDCs are located in different geographical regions so that they would not be subject to the same natural disasters, such as hurricanes, fires, and earthquakes.

Any of the services of described above (and below) may be a microservice that is implemented as a container image executed on the virtual infrastructure of public cloud 10. In one embodiment, each of the services described above is implemented as one or more container images running within a Kubernetes® pod.

In each SDDC 20, regardless of its type and location, a gateway appliance 210 and VIM server appliance 230 are provisioned from the virtual resources of SDDC 20. In one embodiment, gateway appliance 210 and VIM server appliance 230 are each a VM instantiated in different hosts of the same cluster that is managed by VIM server appliance 230. Virtual disk 211 is provisioned for gateway appliance 210 and storage blocks of virtual disk 211 map to storage blocks allocated to virtual disk file 281. Similarly, virtual disk 231 is provisioned for VIM server appliance 230 and storage blocks of virtual disk 231 map to storage blocks allocated to virtual disk file 282.

Gateway appliance 210 functions as a communication bridge between cloud control plane 110 and VIM server appliance 230. In particular, SDDC upgrade agent 220 running in gateway appliance 210 communicates with coordinator 150 to retrieve the tasks (e.g., task to upgrade the VIM server appliance) that were dispatched to coordinator 150 for execution in SDDC 20 and delegates the tasks to services running in VIM server appliance 230 (e.g., LCM 261). After the execution of these tasks have completed, SDDC upgrade agent 220 sends back the execution result to coordinator 150.

Various services running in VIM server appliance 230, including VIM services for managing the SDDC, are depicted as services 260. VI profile service 234 is one such VIM service and is responsible for applying the desired configuration of the virtual infrastructure managed by VIM server appliance 230 (e.g., the number of clusters, the hosts that each cluster would manage, etc.) and the desired configuration of various features provided by other VIM services running in VIM server appliance 230 (e.g., distributed resource scheduling (DRS), high availability (HA), and workload control plane). Configuration and database files 272 for services 260 running in VIM server appliance 230 are stored in virtual disk 231.

Services 260 further include LCM 261 and logical volume (LV) snapshot service 262. LCM 261 is responsible for managing the lifecycle of VIM server appliance 230. LV snapshot service 262 is responsible for generating snapshots of logical volumes, which have logical extents mapped to physical extents of virtual disk 231. The use of LCM 261 and LV snapshot service 262 in the method of upgrading VIM server appliance 230 is further described below with reference to FIGS. 2A-2F.

Figure 2A:
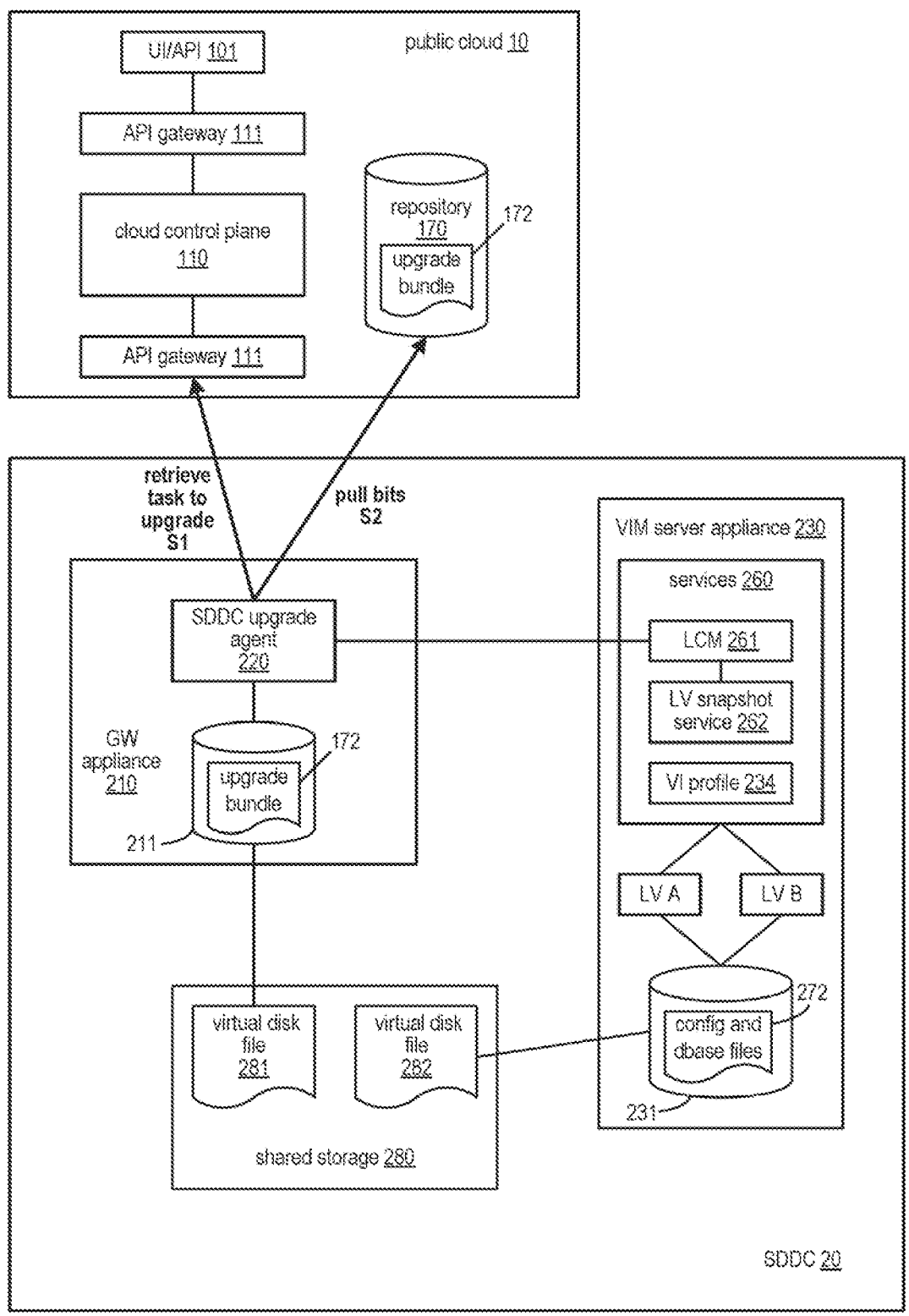
FIGS. 2A-2F are conceptual diagrams illustrating the process of upgrading a VIM server appliance according to embodiments.

FIGS. 2A-2F are conceptual diagrams illustrating the process of upgrading VIM server appliance 230 according to embodiments. FIG. 2A depicts the upgrade preparation phase. During this phase, SDDC upgrade agent 220 retrieves the task to upgrade from cloud control plane 111. The task to upgrade specifies, for example, the target version for the upgrade and the location of the repository (depicted as repository 170 in FIG. 2A) from which the upgrade bundle can be downloaded (step S1). The upgrade bundle contains the image of the upgraded VIM server appliance to be deployed onto a host and is depicted in FIG. 2A as upgrade bundle 172. Upon retrieving the task, SDDC upgrade agent 220 downloads the bits of upgrade bundle 172 from repository 170 (step S2) and stores the bits of upgrade bundle 172 in its virtual disk 211.

In the embodiments, VIM server appliance 230 provisions the storage space of virtual disk 231 as logical volumes to provide for more flexible allocation and management of storage space of virtual disk 231. As an example, two logical volumes, LV A and LV B, are illustrated in FIGS. 2A-2F. As a result, any reads from or writes to configuration and database files 272, which are stored in virtual disk 231, are directed to a logical volume manager (LVM) (not shown), which manages mappings of logical extents of the logical volumes to physical extents of virtual disk 231, and the LVM issues read and write input/output operations (IOs) to virtual disk 231. Accordingly, when a snapshot is taken in the embodiments, a snapshot of the logical volumes is created and thereafter all modifications made to files stored in the logical volumes are performed as copy-on-write, such that the modifications are stored in physical extents that are mapped by a new set of logical volumes (e.g., LV A' and LV B' depicted in FIG. 2B).

Figure 2B:
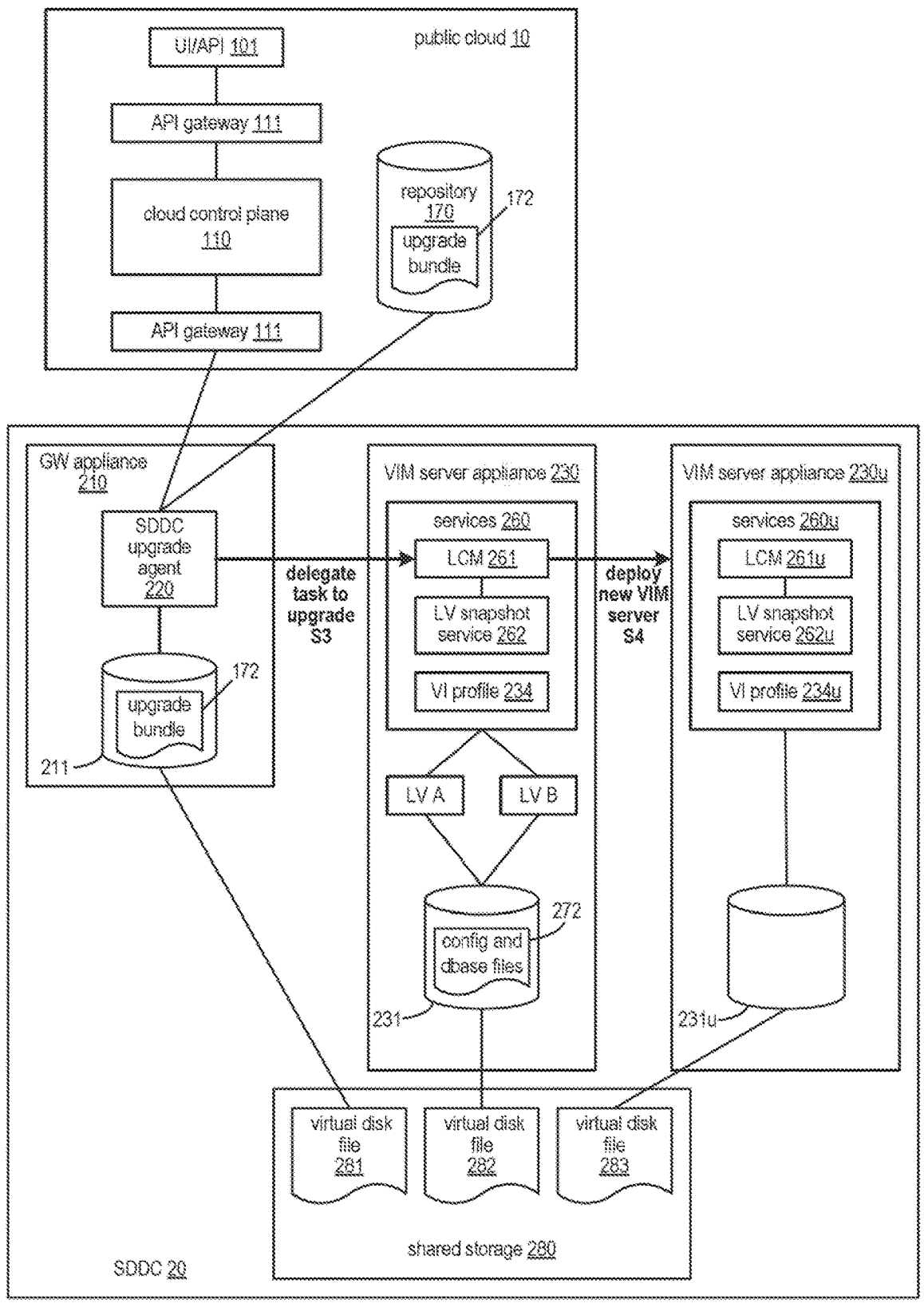

FIG. 2B depicts the upgrade initiation phase. After downloading the bits of upgrade bundle 172 from repository 170, SDDC upgrade agent 220 delegates the task to upgrade to LCM 261 (step S3). In response, LCM 261 selects a host on which the upgraded VIM server appliance is to be deployed and deploys the image of the upgraded VIM server appliance stored in virtual disk 211 on the selected host (step S4). The host is selected from the same cluster of hosts as the hosts on which gateway appliance 210 and VIM server appliance 230 are deployed. The upgraded VIM server appliance is depicted as VIM server appliance 230u in FIG. 2B, and provides upgraded services 260u, including upgraded LCM 261u, LV snapshot service 262u, and VI profile service 234u. Virtual disk 231u is provisioned for VIM server appliance 230u and storage blocks of virtual disk 231u map to storage blocks allocated to virtual disk file 283.

Figure 2C:
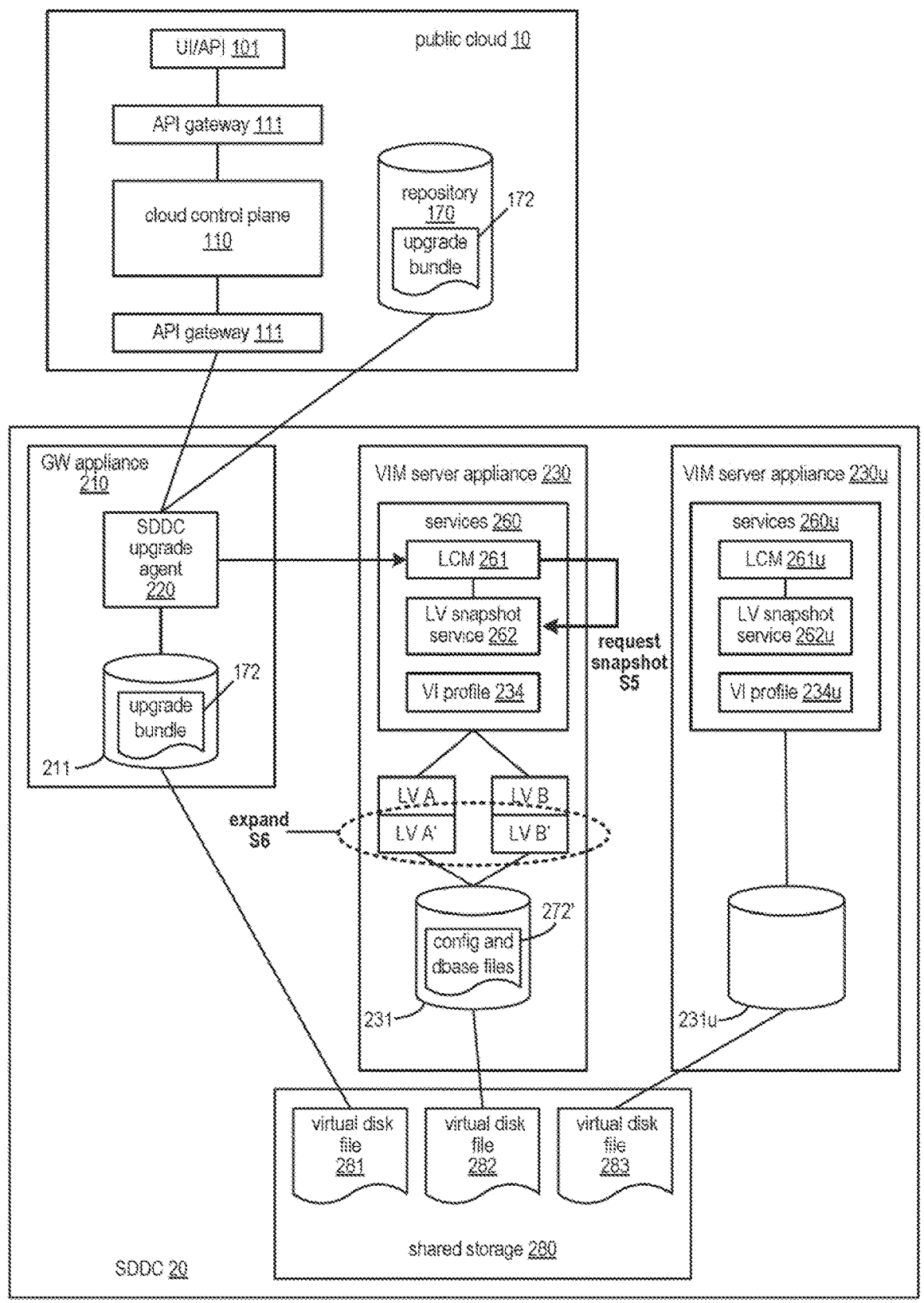

FIG. 2C depicts the snapshot and expansion phase. After the upgraded VIM server appliance is deployed, LCM 261 requests LV snapshot service 262 to take a snapshot of the logical volumes of VIM server appliance 230 (step S5). The snapshot is taken to preserve the state of the logical volumes before configuration and database files 272 are changed to make them compatible with the upgraded VIM server appliance. If the upgrade process fails at any point after the changes have been made, LCM 261 can abort the upgrade process and instruct LV snapshot service 262 to revert back to the snapshot.

In the embodiments, expand and contract approach is used on configuration and database files 272 to evolve their state to make them forward compatible while keeping them backward compatible. This approach reduces the downtime of VIM server appliance 230 during the upgrade process. At step S6, LCM 261 expands configuration and database files 272 to make them forward compatible with the upgraded VIM server appliance. The configuration and database files as modified by this expansion is depicted in FIG. 2C as configuration and database files 272'. The logical volumes that map to the modified portions of configuration and database files 272' are depicted as LV A' and LV B'.

Figure 2D:
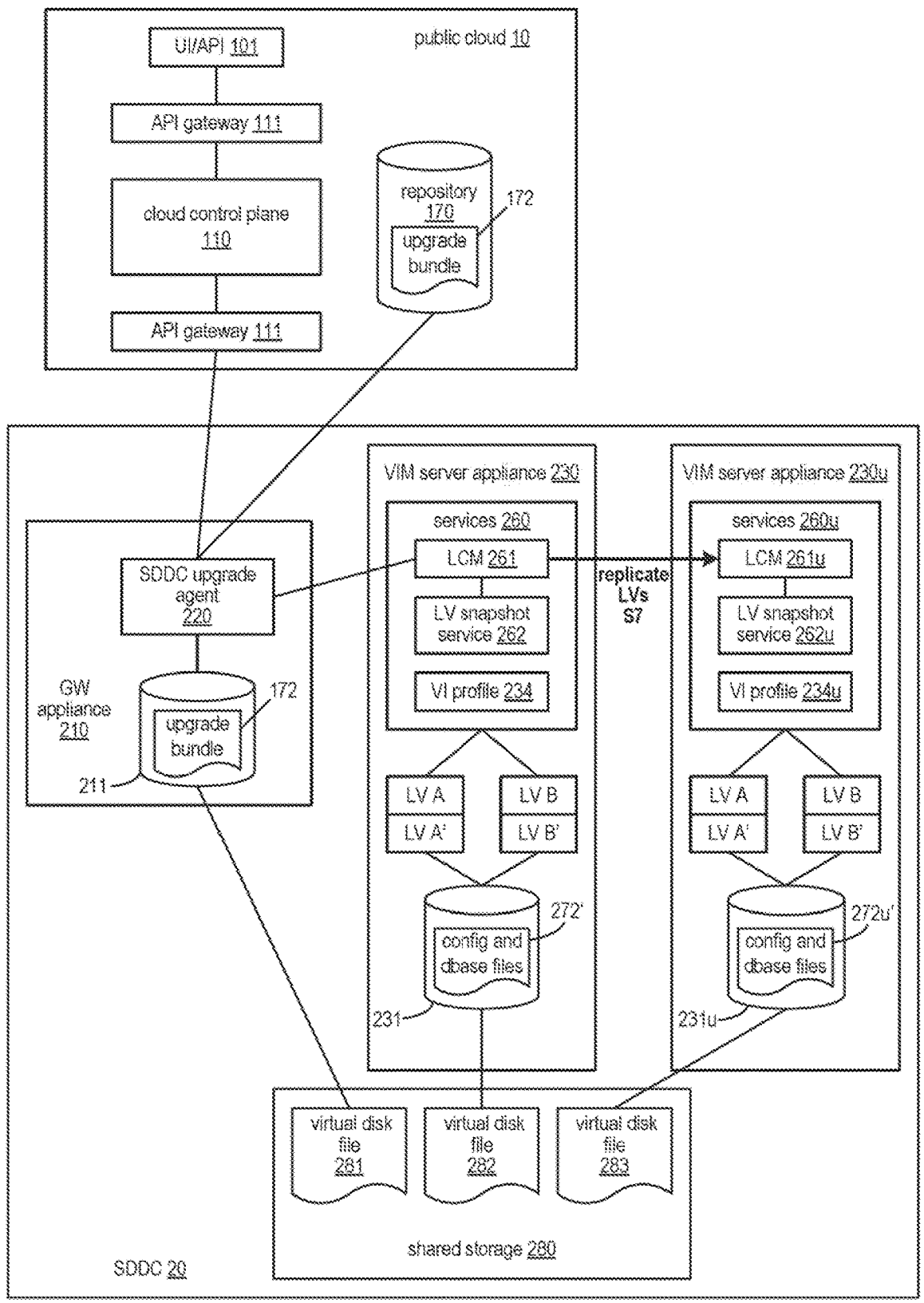

FIG. 2D depicts the replication phase. At step S7, LCM 261 instructs LCM 261u to replicate the logical volumes of VIM server appliance 230, including LV A, LV A', LV B, and LV B'. As a result, data blocks allocated to virtual disk file 282 are copied into data blocks allocated to virtual disk file 283, and logical volumes of VIM server appliance 230u are mapped (e.g., by LVM of VIM server appliance 230u) to locations of virtual disk 231u corresponding to the data blocks of virtual disk file 283 containing the copied contents. Because the copied contents include those of configuration and database files 272', at the conclusion of copying, a copy thereof, depicted as configuration and database files 272u', is stored in virtual disk 231u.

Figure 2E:
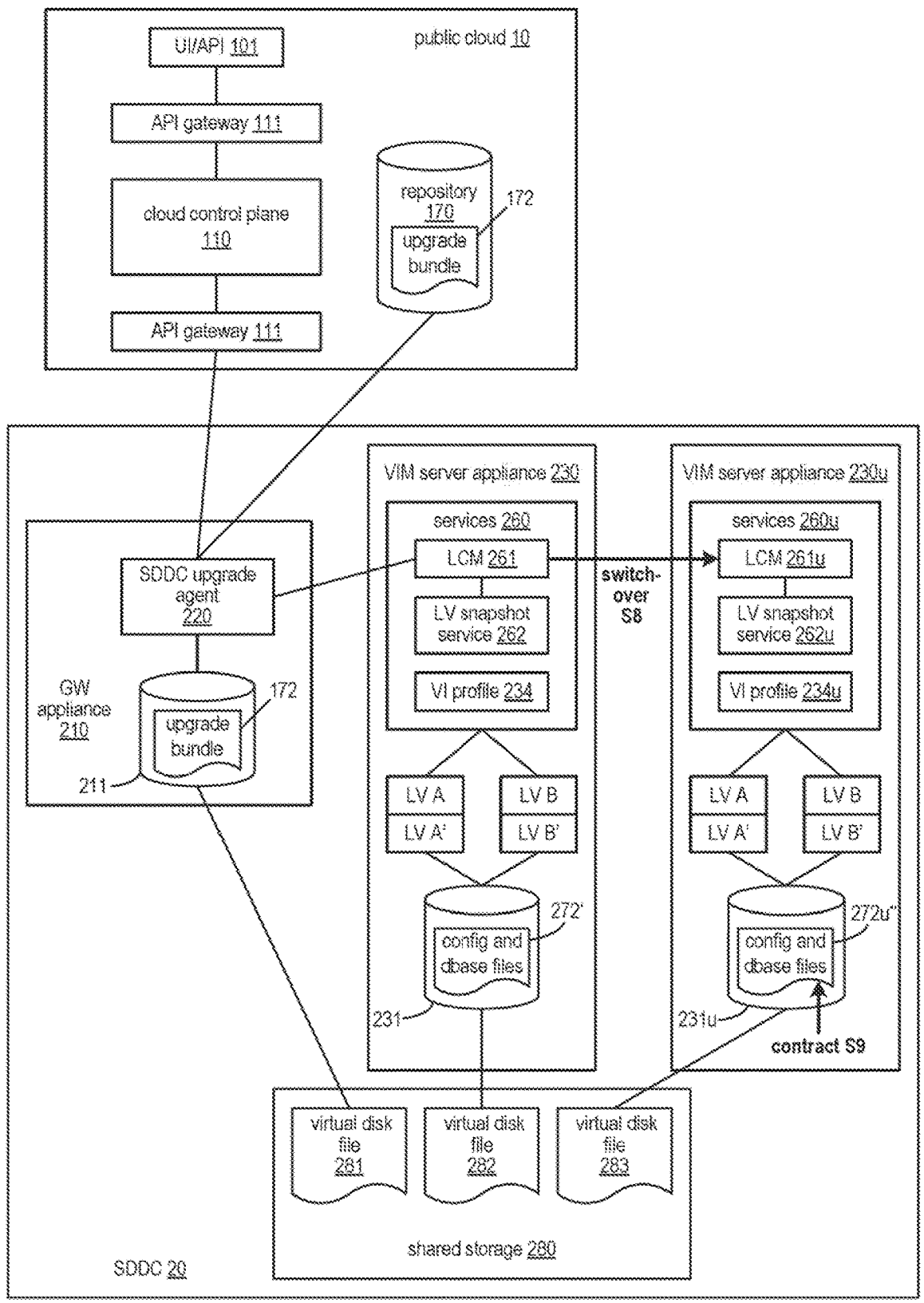

FIG. 2E depicts the switchover and contract phase. During the switchover (step S8), LCM 261 stops the VIM services provided by VIM server appliance 230 and LCM 261u starts the VIM services provided by VIM server appliance 230u. In addition, the network identity of VIM server appliance 230 is applied to VIM server appliance 230u so that requests for VIM services will come into VIM server appliance 230u.

At step S9, LCM 261u contracts configuration and database files 272u' to remove any portions of configuration and database files 272u' that were needed by VIM server appliance 230 but no longer needed by VIM server appliance 230u. The configuration and database files as modified by this contraction is depicted in FIG. 2E as configuration and database files 272".

Figure 2F:
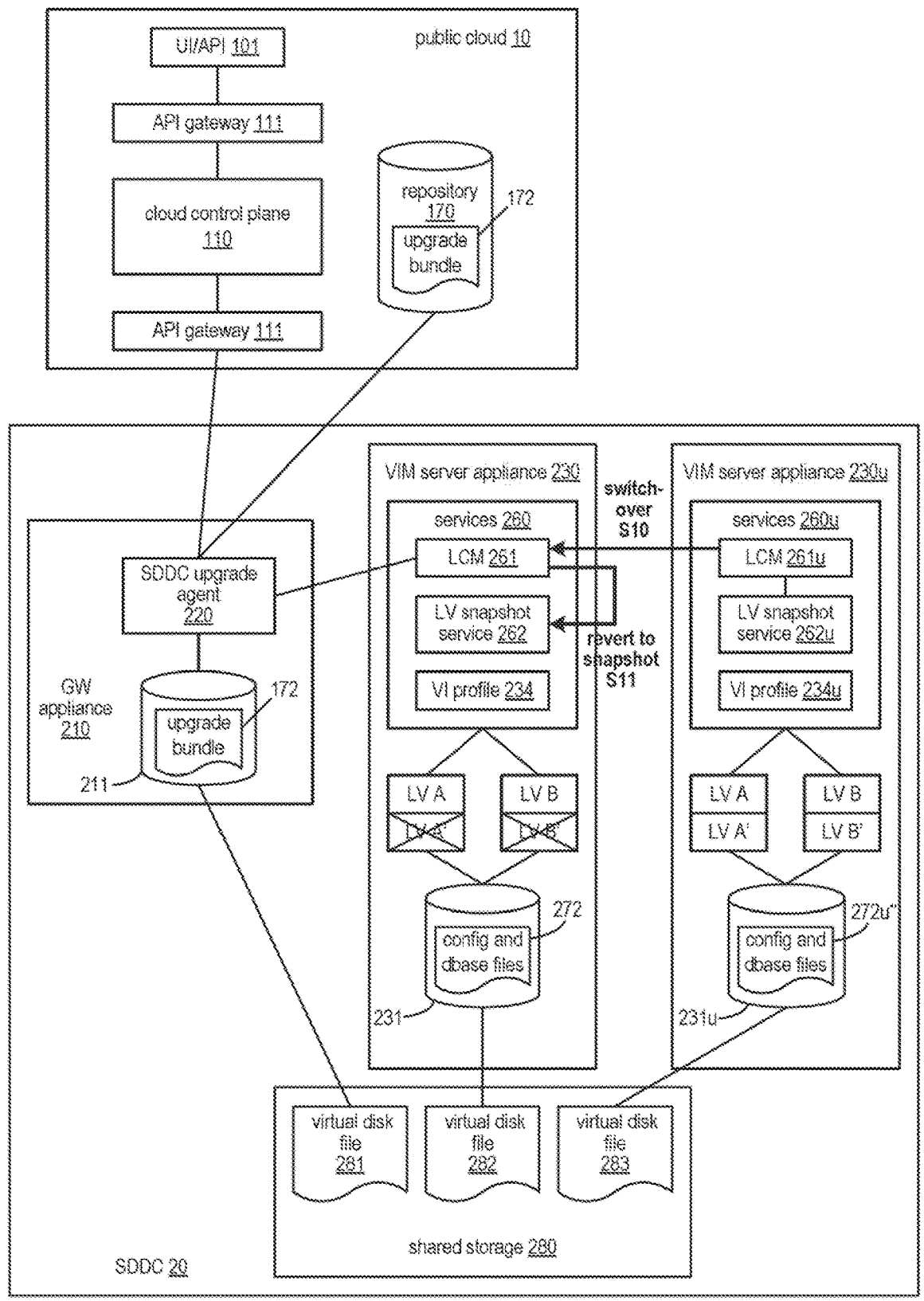

If an upgrade error is detected at any time after the snapshot is taken, the upgrade process enters the error handling phase. The upgrade error may be detected by LCM 261 (e.g., during the expansion) or by LCM 261u (e.g., during replication, switchover, or contraction). FIG. 2F depicts the error handling phase upon detection of the upgrade error by LCM 261u. At step S10, LCM 261u performs a switchover to VIM server appliance 230. During this switchover, LCM 261u stops the VIM services provided by VIM server appliance 230u and LCM 261 starts the VIM services provided by VIM server appliance 230. In addition, the network identity of VIM server appliance 230u is applied to VIM server appliance 230 so that requests for VIM services will come into VIM server appliance 230. Then, LCM 261 instructs LV snapshot service 262 to revert to the snapshot taken in step S5 so that the pre-expanded version of the configuration and database files, depicted in FIG. 2F as configuration and database files 272, will be used in supporting the VIM services.

If the upgrade error is detected by LCM 261, step S10 would not be necessary because it would have been detected prior to the switchover to VIM server appliance 230u, for example, during or shortly after the expansion of configuration and database files 272. Upon detecting the upgrade error at such time, LCM 261 instructs LV snapshot service 262 to revert to the snapshot taken in step S5 so that the pre-expanded version of the configuration and database files, depicted in FIG. 2F as configuration and database files 272, will be used in supporting the VIM services.

Figure 3:
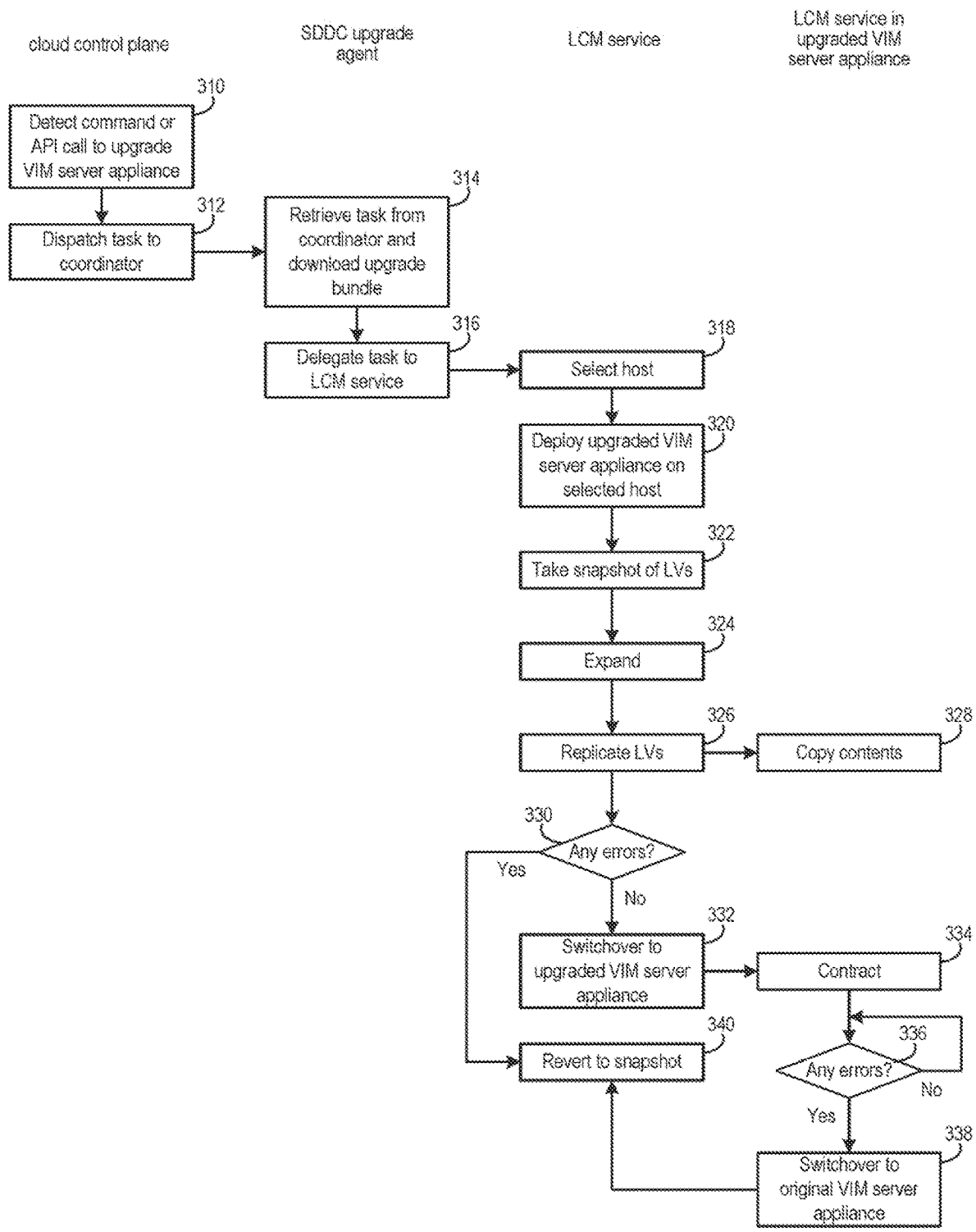
FIG. 3 is a flow diagram that depicts the steps of the process of upgrading a VIM server appliance according to embodiments.

FIG. 3 is a flow diagram that depicts the steps of the process of upgrading a VIM server appliance according to embodiments. The process begins at step 310 when cloud control plane 110 detects a command or an API call to upgrade the VIM server appliance to a new image. In the embodiments described herein, the new image of the VIM server appliance is stored in repository 170 as upgrade bundle 172. Upon receipt of this command or API call, cloud control plane 110 dispatches the task. The remaining steps depicted in FIG. 3 are described above and are not repeated here. Step 314 corresponds to steps S1 and S2. Step 316 corresponds to step S3. Steps 318 and 320 correspond to step S4. Step 322 corresponds to step S5. Step 324 corresponds to step S6. Steps 326 and 328 correspond to step S7. Step 330 corresponds to detection of upgrade error by LCM 261. Step 332 corresponds to step S8. Step 334 corresponds to step S9. Step 336 corresponds to detection of upgrade error by LCM 261u. Step 338 corresponds to step S10. Step 340 corresponds to step S11.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of upgrading a virtual infrastructure management (VIM) server appliance, said method comprising:
   creating by a first VIM server appliance, which is the VIM server appliance to be upgraded, a snapshot of logical volumes mapped to physical volumes that store configuration and database files of VIM services provided by the first VIM server appliance;
   after the snapshot is created, expanding by the first VIM server appliance, the configuration and database files to be compatible with a second VIM server appliance;
   replicating the logical volumes of the first VIM server appliance, which have been modified as a result of expanding the configuration and database files, in the second VIM server appliance;
   after replication, performing a switchover of VIM services that are provided, from the first VIM server appliance to the second VIM server appliance so that the VIM services are provided by the second VIM server appliance after the switchover; and
   upon failure of any of the steps of expanding, replicating, and performing the switchover, aborting the upgrade, and reverting to a version of the configuration and database files that was preserved by creating the snapshot.

2. The method of claim 1, wherein the VIM services are provided to a plurality of clusters of hosts, including a cluster that includes a first host on which the first VIM server appliance is running and a second host on which the second VIM server appliance is running.

3. The method of claim 2, further comprising:
   downloading an image of the second VIM server appliance from a cloud repository; and
   deploying the second VIM server appliance on the second host using the downloaded image.

4. The method of claim 3, wherein the cluster further includes a third host on which a gateway appliance is running, and the gateway appliance has an agent of cloud services running therein to retrieve instructions from the cloud services, including an instruction to upgrade the VIM server appliance.

5. The method of claim 1, further comprising:
   after the switchover, at the second VIM server appliance, contracting the configuration and database files to be compatible with the second VIM server appliance and no longer compatible with the first VIM server.

6. The method of claim 5, further comprising:
   if after the switchover, an error in the second VIM server appliance is detected, performing a switchover back to the first VIM server appliance, and at the first VIM server appliance, reverting to a version of the configuration and database files that was preserved by creating the snapshot.

7. The method of claim 1, wherein the first and second VIM server appliances are virtual machines each including one or more virtual disks that store the configuration and database files.

8. A non-transitory computer readable medium comprising instructions to be executed in a computer system to carry out a method of upgrading a virtual infrastructure management (VIM) server appliance, said method comprising:
   creating by a first VIM server appliance, which is the VIM server appliance to be upgraded, a snapshot of logical volumes mapped to physical volumes that store configuration and database files of VIM services provided by the first VIM server appliance;
   after the snapshot is created, expanding by the first VIM server appliance, the configuration and database files to be compatible with a second VIM server appliance;
   instructing the second VIM server appliance to replicate the logical volumes of the first VIM server appliance, which have been modified as a result of expanding the configuration and database files;
   after replication, performing a switchover of VIM services that are provided, from the first VIM server appliance to the second VIM server appliance so that the VIM services are provided by the second VIM server appliance after the switchover; and
   upon failure of any of the steps of expanding, replicating, and performing the switchover, aborting the upgrade, and reverting to a version of the configuration and database files that was preserved by creating the snapshot.

9. The non-transitory computer readable medium of claim 8, wherein the VIM services are provided to a plurality of clusters of hosts, including a cluster that includes a first host on which the first VIM server appliance is running and a second host on which the second VIM server appliance is running.

10. The non-transitory computer readable medium of claim 9, wherein said method further comprises:
    deploying the second VIM server appliance on the second host using an image of the second VIM server appliance that is downloaded from a cloud repository.

11. The non-transitory computer readable medium of claim 10, wherein the method is carried out in response to an instruction to upgrade the VIM server appliance received from a gateway appliance, which has an agent of cloud services running therein to retrieve instructions from the cloud services, including the instruction to upgrade the VIM server appliance.

12. The non-transitory computer readable medium of claim 11, wherein the cluster further includes a third host on which the gateway appliance is running.

13. The non-transitory computer readable medium of claim 8, wherein the first and second VIM server appliances are virtual machines each including one or more virtual disks that store the configuration and database files.

14. A computer system including a cluster of hosts that are programmed to carry out a method of upgrading a virtual infrastructure management (VIM) server appliance, said method comprising:
    creating by a first VIM server appliance, which is the VIM server appliance to be upgraded, a snapshot of logical volumes mapped to physical volumes that store configuration and database files of VIM services provided by the first VIM server appliance;
    after the snapshot is created, expanding by the first VIM server appliance, the configuration and database files to be compatible with a second VIM server appliance;
    replicating the logical volumes of the first VIM server appliance, which have been modified as a result of expanding the configuration and database files, in the second VIM server appliance;
    after replication, performing a switchover of VIM services that are provided, from the first VIM server appliance to the second VIM server appliance so that the VIM services are provided by the second VIM server appliance after the switchover; and
    upon failure of any of the steps of expanding, replicating, and performing the switchover, aborting the upgrade, and reverting to a version of the configuration and database files that was preserved by creating the snapshot.

15. The computer system of claim 14, wherein the cluster of hosts include a first host on which the first VIM server appliance is running and a second host on which the second VIM server appliance is running, and the VIM services are provided to the cluster of hosts and other clusters of hosts.

16. The computer system of claim 15, wherein the method further comprises:
    downloading an image of the second VIM server appliance from a cloud repository; and
    deploying the second VIM server appliance on the second host using the downloaded image.

17. The computer system of claim 16, wherein the cluster of hosts further include a third host on which a gateway appliance is running, and the gateway appliance has an agent of cloud services running therein to retrieve instructions from the cloud services, including an instruction to upgrade the VIM server appliance.

18. The computer system of claim 14, wherein the method further comprises:
    after the switchover, at the second VIM server appliance, contracting the configuration and database files to be compatible with the second VIM server appliance and no longer compatible with the first VIM server.

19. The computer system of claim 18, wherein the method further comprises:
    if after the switchover, an error in the second VIM server appliance is detected, performing a switchover back to the first VIM server appliance, and at the first VIM server appliance, reverting to a version of the configuration and database files that was preserved by creating the snapshot.

20. The computer system of claim 14, wherein the first and second VIM server appliances are virtual machines each including one or more virtual disks that store the configuration and database files.

* * * * *